United States Patent

[11] 3,599,058

[72] Inventors Ekkehard Schillmann;
Heinz Eggert, both of Berlin, Germany
[21] Appl. No. 819,737
[22] Filed Apr. 28, 1969
[45] Patented Aug. 10, 1971
[73] Assignee Siemens Aktiengesellschaft
Berlin and Munich, Germany
[32] Priority Apr. 26, 1968
[33] Germany
[31] P 17 64 223.8

[54] SELENIUM RECTIFIER PLATE FOR USE AS AN OVERVOLTAGE DIVERTER
5 Claims, 2 Drawing Figs.

[52] U.S. Cl. .......... 317/241, 29/576
[51] Int. Cl. .......... H01l 3/02
[50] Field of Search .......... 317/241; 29/576

[56] References Cited
UNITED STATES PATENTS

| | | | |
|---|---|---|---|
| 2,279,746 | 4/1942 | Thompson et al. | 317/241 |
| 2,349,622 | 5/1944 | Hewlett | 317/241 X |
| 2,437,995 | 3/1948 | Blackburn | 317/241 X |
| 2,479,301 | 8/1949 | Blackburn et al. | 317/241 |
| 2,736,850 | 2/1956 | Lidow | 317/241 |

*Primary Examiner*—James D. Kallam
*Attorneys*—Curt M. Avery, Arthur E. Wilfond, Herbert L. Lerner and Daniel J. Tick

ABSTRACT: It is known to use selenium rectifier plates which are loaded in blocking direction as overvoltage diverters, to protect silicon rectifiers, for example. The invention provides a selenium rectifier plate with a selenium layer of a thickness of at least 100 × 10¹4 cm. and a weak halogen doping of at most 100 p.p.m. chlorine.

SELENIUM RECTIFIER PLATE FOR USE AS AN OVERVOLTAGE DIVERTER

Figure 1:
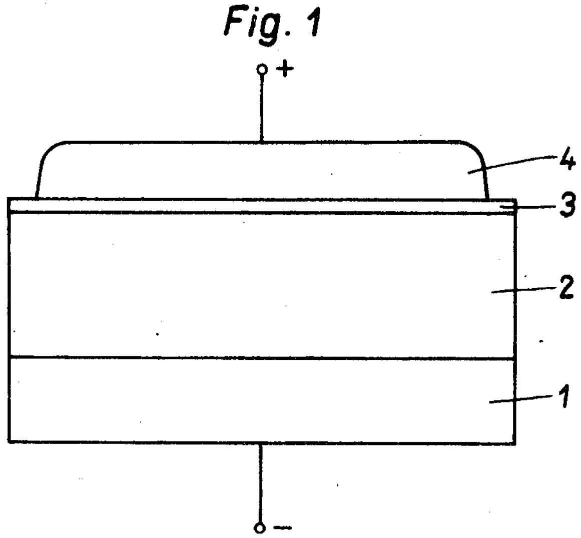

It is known to protect generators or monocrystalline semiconductor components having one or more PN junctions (rectifiers, thyristors) with overvoltage diverters comprised of at least one selenium rectifier plate. The selenium rectifier plates are connected in parallel with the component to be protected in such a way that they are charged in the blocking direction by possibly occurring overvoltage pulses. The fact is utilized thereby that a selenium rectifier plate has a considerably greater energy absorption capacity when stressed by an overvoltage pulse than, for example, a silicon rectifier or a silicon thyristor. Up to now, conventional power selenium rectifiers were used for this purpose.

The present invention has as its object a selenium rectifier plate whose properties are especially adjusted to function as an overvoltage diverter.

The invention relates to a selenium rectifier plate which is used as an overvoltage diverter by being charged in the blocking direction. The invention is characterized by the fact that the selenium rectifier plate has a selenium layer of at least $100\times10^{14}$ cm. thickness which is doped with chlorine at a concentration from 1 to a maximum of 100 p.p.m. (parts per million chlorine to selenium), or with an appropriate amount of another halogen. Besides chlorine, bromine is a suitable halogen. The bromine concentration should be between 2 and 200 p.p.m., according to atom weights ratio.

The indicated lower limit for the thickness of the selenium layer is approximately double that conventionally used in selenium rectifiers, and the halogen doping is considerably lower than in the latter. Both measures result in the fact that the voltage drop in the selenium layer is relatively high, i.e., the higher the blocking current flowing, the larger is the voltage drop. The ohmic share of the blocking characteristic is thus amplified, i.e., the curve of the blocking characteristic is reduced ("soft" blocking characteristic). Moreover, a considerable portion of the blocking voltage is kept away from the blocking or barrier layer so that the breakdown voltage of the barrier layer occurs only at a higher gross-blocking voltage. Also, due to the slight halogen doping, the physical barrier layer, i.e., the region deprived of load carriers, is relatively large so that the breakdown voltage at the barrier layer is high, due to the reduced field intensity. Generally, our proposed selenium rectifier plate affords a high energy absorption capacity, which is at least four times that in normal selenium rectifiers.

The lower limit of the halogen doping results from the fact that energy absorption capacity again declines when doping is extremely low. It is preferred that the chlorine doping does not drop below 10 p.p.m.

The blocking ability of the selenium rectifier plate can be increased in a known manner by providing, between the halogen doped selenium layer and the lid electrode, another selenium layer which is 1 to $10\times10^{14}$ cm. and is doped with thallium. The thallium concentration in this layer can, for example, amount to 1,000 p.p.m. and the thickness of the layer can be about $5\times10^{14}$ cm.

During the production of selenium rectifiers, a so-called "thermal forming" is effected to convert the selenium layer into its hexagonal modification, which is best conducting. This forming is effected by tempering the plate at a temperature slightly below the melting point of selenium, e.g., 218° C. The conductivity of the selenium layer passes a maximum. In the conventional selenium rectifiers, thermal forming must be continued until this maximum is reached. By contrast, it was shown in a selenium rectifier plate used to the same end that the energy absorption capacity of the finished plate is considerably greater after the completion of the thermal forming, before the conductivity of the selenium layer obtains its maximum value. Thus, thermal forming can be interrupted after half the time required to obtain a maximum conductivity.

Figure 2:
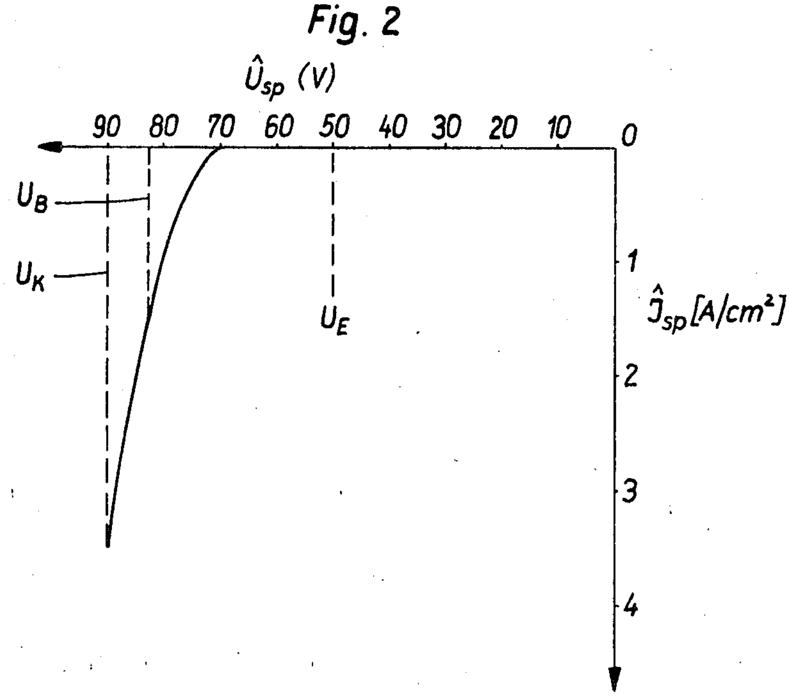

In the drawing,

FIG. 1 shows a section through a selenium rectifier plate constituting an embodiment example of the invention; and FIG. 2 shows the blocking characteristics of the selenium rectifier of FIG. 1.

In the interest of clarity, the thickness measurements are grossly exaggerated. The selenium rectifier plate of FIG. 1 is comprised of a metallic carrier electrode 1, for example of iron, two selenium layers 2 and 3 and a lid electrode 4. The selenium layers 2 and 3 are preferably applied by vapor deposition upon the carrier electrode 1, whereby the latter is prepared in the usual manner, e.g., by roughening and by producing a nickel/selenide layer (not shown in the drawing). The selenium layer 2 is about $120\times10^{14}$ cm. thick. This layer is doped with 60 p.p.m. chlorine. The selenium layer 3 is about $5\times10^{1}$ thick and doped with 1,000 p.p.m. thallium. The cover electrode 4 is preferably comprised of a cadmium/tin alloy, for example 32 percent cadmium and 68 percent tin. When used as an overvoltage diverter, the selenium rectifier plate is stressed as indicated in FIG. 1, i.e., in the blocking direction.

In the interest of clarity, the thickness measurements are grossly exaggerated. The selenium rectifier plate of FIG. 1 is comprised of a metallic carrier electrode 1, for example of iron, two selenium layers 2 and 3 and a lid electrode 4. The selenium layers 2 and 3 are preferably applied by vapor deposition upon the carrier electrode 1, whereby the latter is prepared in the usual manner, e.g., by roughening and by producing a nickel/selenide layer (not shown in the drawing). The selenium layer 2 is about $120 \times10^{116\ 4}$ cm thick. This layer is doped with 60 p.p.m. chlorine. The selenium layer 3 is about $5 \times10^{14}$ thick and doped with 1,000 p.p.m. thallium. The cover electrode 4 is preferably comprised of a cadmium/tin alloy, for example 32 percent cadmium and 68 percent tin. When used as an overvoltage diverter, the selenium rectifier plate is stressed as indicated in FIG. 1, i.e., in the blocking direction.

FIG. 2 shows the blocking characteristics of a selenium rectifier plate according to FIG. 1. The abscissa illustrates the peak blocking voltage $\hat{U}_{sp}$ in volts, and the ordinate shows the peak blocking current $\hat{I}_{sp}$ in a./cm².

At the scale chosen for the blocking current, the deviation of the blocking characteristic from the ordinate is hardly discernible, up to a blocking voltage of 70 v. The blocking current rises steeply above 70 v.

In FIG. 2, the starting peak voltage of the selenium rectifier plate is indicated as $U_E$, i.e., this constitutes the peak voltage which stresses the rectifier plate in the blocking direction during normal operation of the apparatus to be protected. According to FIG. 2, the starting peak voltage amounts to approximately 50 v.

$U_B$ denotes the maximum surge discharge voltage, meaning value to which the voltage is limited at the apparatus to be protected. This maximum discharge voltage corresponds to approximately the middle of the steep characteristic curve rise. In the example, this amounts to about 82 v.; whereby a peak-blocking current flows at approximately 1.5 a./cm².

$U_K$ indicates the breakdown voltage, i.e., the voltage at which single disruptive discharges (spikes or crackles) occur at the selenium rectifier plate. The breakdown voltage amounts to approximately 90 v., the corresponding maximum peak-blocking current is about 3.5 a./cm². A disruptive discharge in no way destroys the selenium rectifier plate, but rather, it results in a direct self-healing of the disruptive discharge point (a so-called healthy burning), whereby the lid electrode material above the breakdown point evaporates partly and is, partly, removed through centrifugal action. The momentary short circuit, during the breakdown, constitutes an effective protection for the connected component, during extremely high overvoltage.

As an example of the effectiveness of a selenium rectifier plate of the present invention used as an overvoltage protection, we would indicated that a plate with 20 cm². of active surface has an energy absorption capacity of about 100 Ws, during an overvoltage pulse lasting 100 msec., without breakdown occuring.

We claim:

1. A selenium rectifier plate for use as an overvoltage diverter when charged in the blocking direction, which comprises a selenium layer which is at least 100 $10^{116\ 4}$ cm. thick and is doped with halogen selected from the group consisting of chlorine and bromine, when chlorine is used it is in a concentration of from 1 to 100 p.p.m. and when bromine is used it is in a concentration of from 2 to 200 p.p.m.

2. The rectifier of claim 1, wherein chlorine in a concentration from 1 to 100 p.p.m. is used.

3. The rectifier of claim 1, wherein bromine in a concentration of 2 to 200 p.p.m. is used.

4. The selenium rectifier of claim 1, wherein a selenium layer is provided at a thickness of about 1 to 10 $^{16\ 4}$ cm. and doped with thallium between the selenium layer and a lid electrode.

5. The method of producing a selenium rectifier plate for use as an overvoltage diverter when charged in the blocking direction, comprising a selenium layer which is at least 100 $\times 10^{116\ 4}$ cm. thick and is doped with a halogen selected from the group consisting of chlorine and bromine, when chlorine is used it is in a concentration of from 1 to 100 p.p.m. and when bromine is used it is in a concentration of from 2 to 200 p.p.m., which comprises stopping the thermal forming of the halogen coated selenium layer before the conductivity of said layer reaches its maximum value.